United States Patent

[11] 3,578,167

[72] Inventors Willis E. Clack;
   Clifford Kay; Charles E. Nygren, Madison, Wis.
[21] Appl. No. 776,925
[22] Filed Nov. 19, 1968
[45] Patented May 11, 1971
[73] Assignee Clack Corporation
   Madison, Wis.

[54] MULTIPLE-TANK WATER CONDITIONING SYSTEM AND VALVE THEREFOR
2 Claims, 3 Drawing Figs.

[52] U.S. Cl. .................................................. 210/134,
   210/140, 210/253, 210/264, 210/278
[51] Int. Cl. ....................................................... B01d 29/08
[50] Field of Search ............................................. 210/138,
   140, 253, 264, 278, 134; 137/625.5, 625.69

[56] References Cited
UNITED STATES PATENTS
| | | | |
|---|---|---|---|
| 2,863,559 | 12/1958 | Schulze ........................ | 210/138X |
| 3,154,484 | 10/1964 | Stoner ......................... | 210/264X |

Primary Examiner—Samih N. Zaharna
Attorneys—Joseph G. Werner, Theodore J. Long, John M. Winter and James A. Kemmeter ABSTRACT: A pair of water conditioning tanks each having a service port. The service ports are connected to each other and to a service outlet conduit. A pair of semibalanced, direct-acting control valves are provided, each having an inlet port, a tank port connected to one of the conditioning tanks, and a drain port. Each valve has a pressure responsive piston engaging the valve stem and a conduit for supplying line pressure to the piston to assist in operating the valve. Timed motor operators alternately maintain one of the valves in service position and the other in backwash position whereby each tank can be backwashed with conditioned water from the other.

Patented May 11, 1971

INVENTORS
WILLIS E. CLACK
CLIFFORD KAY
CHARLES E. NYGREN
BY *Joseph G. Werner*
*John W. Winter*
ATTORNEYS Patented May 11, 1971

INVENTORS
WILLIS E. CLACK
CLIFFORD KAY
CHARLES E. NYGREN

BY

ATTORNEYS

MULTIPLE-TANK WATER CONDITIONING SYSTEM AND VALVE THEREFOR

BACKGROUND OF THE INVENTION

1. Field of the Invention

This invention relates to multiple-tank water conditioning systems including semibalanced, direct-acting control valves permitting each tank to be backwashed with conditioned water from another tank.

2. Description of the Prior Art

In the past, the conditioning tanks in multiple-tank water conditioning systems were typically backwashed with raw water. This, of course, does not provide as efficient cleaning as backwashing with conditioned water.

Typically, standard diaphragm valves have been used on such multiple-tank installations. While semibalanced, direct-acting valves have been known for sometime, they haven't been developed for use in multiple-tank water conditioning systems.

In a simple direct-acting valve, the force the operating mechanism, such as a motor, must exert to open the valve equals the product of the pressure across the valve and the area of the valve seat. If there is no back pressure on the valve, then the force which must be exerted by the operator to open the valve is the product of the line pressure and the area of the valve seat. Because of this, the port diameters of direct-acting valves are generally smaller than the inside diameter of the connecting lines. Generally, simple direct-acting valves with full pipe area, that is, where the valve port area is substantially the same as that of the connecting lines, require high-power actuators or are limited to use in relatively low pressure systems. For higher pressure systems requiring larger port diameters, the use of semibalanced, direct-acting valves has been suggested.

In these semibalanced, direct-acting valve constructions the reciprocal valve stem has an upper valve member and a slightly smaller lower member. The valve members open and close upper and lower valve seats respectively. The inlet pressure is directed downward on top of the larger upper member and upward on the smaller lower member. The force which must be exerted by the operator to open the valve is therefore quite small because the valve is "semibalanced," that is, there is only a small unbalance of pressure acting on the valve member. Several problems have plagued the known semibalanced, direct-acting valves as described. Very close tolerances must be maintained so that both valve members seat simultaneously in fluid tight relation. Furthermore, because both valve members are unseated when the stem is lifted, the advantage of the semibalanced condition is immediately lost when the lower member is unseated.

SUMMARY OF THE INVENTION

We have provided a multiple-tank water conditioning system having semibalanced, direct-acting control valves permitting each tank to be sequentially backwashed with conditioned water from another tank in the system. Line pressure is continuously applied to the valve piston which together with the valve housing defines an expandable and contractable chamber in each of the control valves so that the mechanical advantage of the semibalanced condition is maintained continuously. This continuous application of line pressure permits the utilization of a much smaller valve operator than would otherwise be required for the control valves.

Proper sealing of the valves is provided by annular T-rings mounted on the periphery of the valve elements for movement within tubular valve seats. The T-rings seal outwardly against the cylindrical walls of the seats and do not roll and twist the way O-rings tend to do when moved into and out of a valve seat.

The valves are designed for easy assembly and maintenance. The valve members and piston mounted on the stem are smaller in diameter than the bore diameters, whereby, the valve stem, with its accompanying valve elements and piston intact, may be inserted into and withdrawn from the top of the valve housing.

Further objects, features and advantages of our invention will be apparent from the following detailed description taken in conjunction with the accompanying drawings wherein a preferred embodiment of the invention is shown for exemplification.

DETAILED DESCRIPTION OF THE PREFERRED EMBODIMENT

Figure 1:
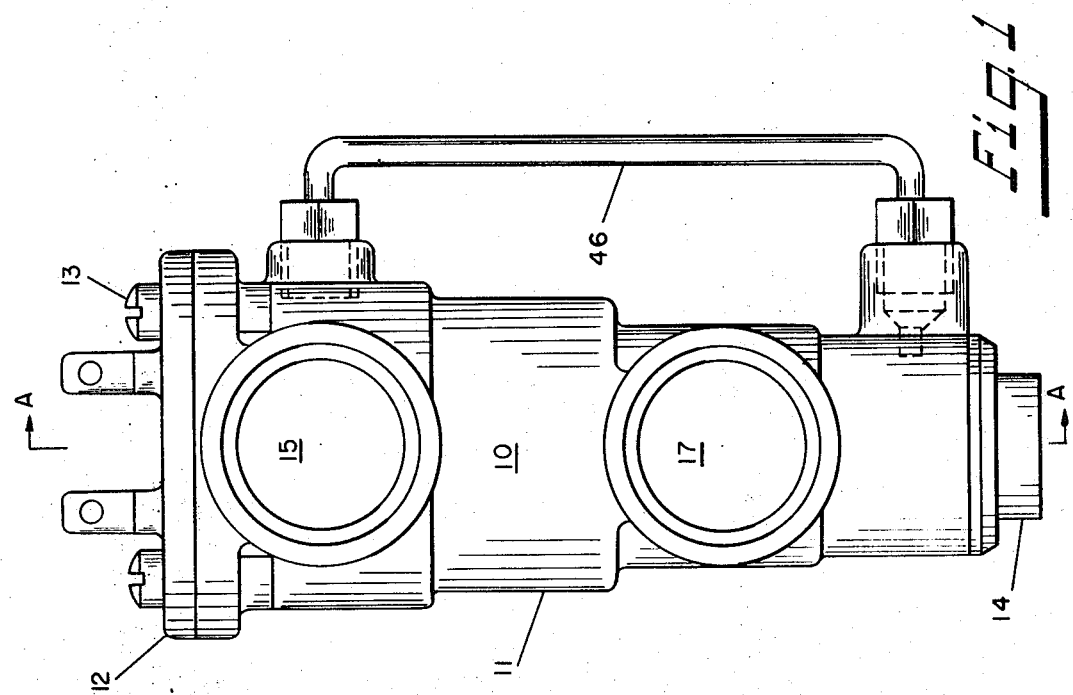
FIG. 1 is a side elevation view of a semibalanced, direct-acting valve forming part of our new multiple-tank water conditioning system.

Referring now more particularly to the drawings wherein like numerals refer to like parts throughout the several views, each of the control valves in the twin-tank water conditioning system shown has a three-piece valve housing generally indicated by reference numeral 10 in the drawings. The housing has a central hollow casting 11, a cover plate 12 secured thereon by screws 13, and has a threaded bottom cap 14.

Each of the valves 10 has in descending order, an inlet port 15, a tank port 16 and a drain port 17. Each valve also has, in descending order, an inlet chamber 18 in direct communication with the inlet port 15, a tank chamber 19 in direct communication with the tank port 16, a drain chamber 20 in direct communication with the drain port 17, and a fourth chamber 21.

A first inwardly facing tubular valve seat 22 is formed in the valve housing between the inlet chamber 18 and the tank chamber 19. A second inwardly facing tubular valve seat 24 is formed in the valve housing between the drain chamber 20 and the tank chamber 19.

A reciprocal valve stem 25 extends downwardly through the cover plate 12 into the valve chambers. The valve stem is slidably sealed in fluidtight relation in the valve housing by bushing 26 and O-rings 27 and 28. The stem of each valve is adapted to be reciprocated by a motor 29 shown in FIG. 3 mounted on the cover plate 12. Each motor is controlled by a timer 30.

Figure 2:
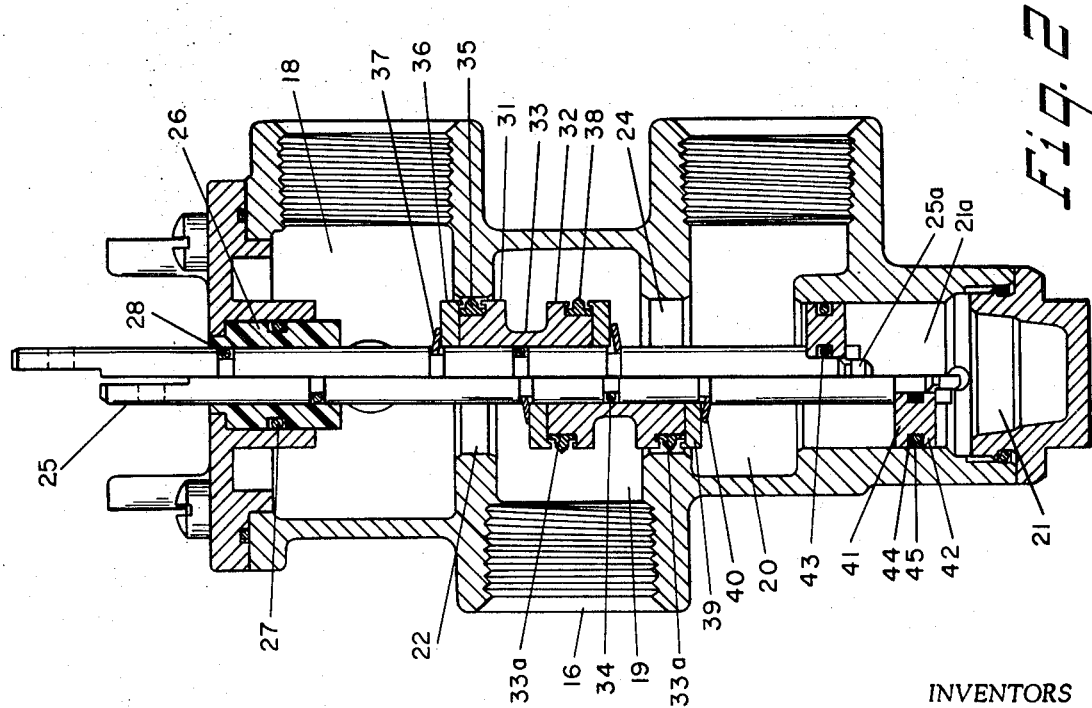
FIG. 2 is a section view taken along section line A-A of FIG. 1, wherein the reciprocal valve stem has been split for illustrative purposes. The left half of the valve stem is in "service position" and the right half is in "backwash position."

As shown in FIG. 2, an upper valve element, generally shown at 31, is adapted to seal against the inwardly facing cylindrical wall of the upper valve seat 22 and a lower valve element shown at 32, is adapted to seal against the inwardly facing cylindrical wall of lower valve seat 24.

A tubular retaining hub 33 is concentrically mounted on the valve stem 25 and sealed in fluid tight engagement therewith by an O-ring 34. Retaining hub 33 has annular grooves 33a adjacent its upper and lower ends. A rubber T-ring 35 is positioned in the upper groove and maintained therein by an upper flanged retaining disc 36 which is held in abutment with the upper end of the retaining hub by a snapring 37. A second rubber T-ring 38 is similarly positioned in the lower of grooves 33a and maintained therein by a lower flanged retaining disc 39. Retaining disc 39 is held in abutment with the lower end of the retaining hub by a second snapring 40. The snaprings also serve to hold the valve elements against axial movement on the valve stem.

The tubular retaining hub and retaining discs are slightly smaller in diameter than the tubular valve seats so as to pass freely therethrough. The T-rings extend outward slightly beyond the periphery of the hub and disc into sealing engagement against the inwardly facing valve seats. The T-rings slide into and out of engagement with the tubular valve seats without the rolling and twisting problem which occurs when O-rings are moved into and out of engagement with a tubular valve seat.

This particular valve arrangement assures a good seal without requiring the maintenance of close manufacturing tolerances since the T-rings of the valve elements can seal at any point along the length of the tubular valve seats.

A piston, generally shown at 41, is secured to the narrowed lower end 25a of the valve stem 25 as shown in FIG. 2. The piston 41 comprises an annular metal ring 42 mounted on the reduced diameter end portion 25a of the valve stem. The ring 42 is maintained in fluidtight relation on the valve stem by an internal O-ring 43. The ring 42 has a peripheral groove 44 which receives an O-ring 45. O-ring 45 slides in fluidtight relation on the wall 21a of chamber 21 formed in the valve housing 10. The piston thus forms the reciprocal top wall of the expandable and contractable valve chamber 21.

As shown in FIG. 1, a tubular conduit 46 connects the inlet chamber 18 of the valve with chamber 21 so that the line pressure of the system in which the valve is used is applied in chamber 21 to the underside of the piston 41 to assist the valve motor in raising the valve stem. This pressurized fourth chamber 21 provides a semibalanced system enabling the valve to be operated with a much smaller motor than would otherwise be required for a direct-acting valve with port diameters which are at least as large as the flow diameters of the connecting lines.

The diameter of the piston 41, like the diameter of valve elements 31 and 32, is somewhat less than the diameter of the openings defined by the tubular valve seats 22 and 24 so that the valve stem may be withdrawn or inserted into the valve housing when the cover plate is removed from the valve housing.

It will also be noted that the piston area against which the line pressure in chamber 21 acts is somewhat less than the area of upper valve element 31 against which the line pressure in inlet chamber 18 acts.

Figure 3:
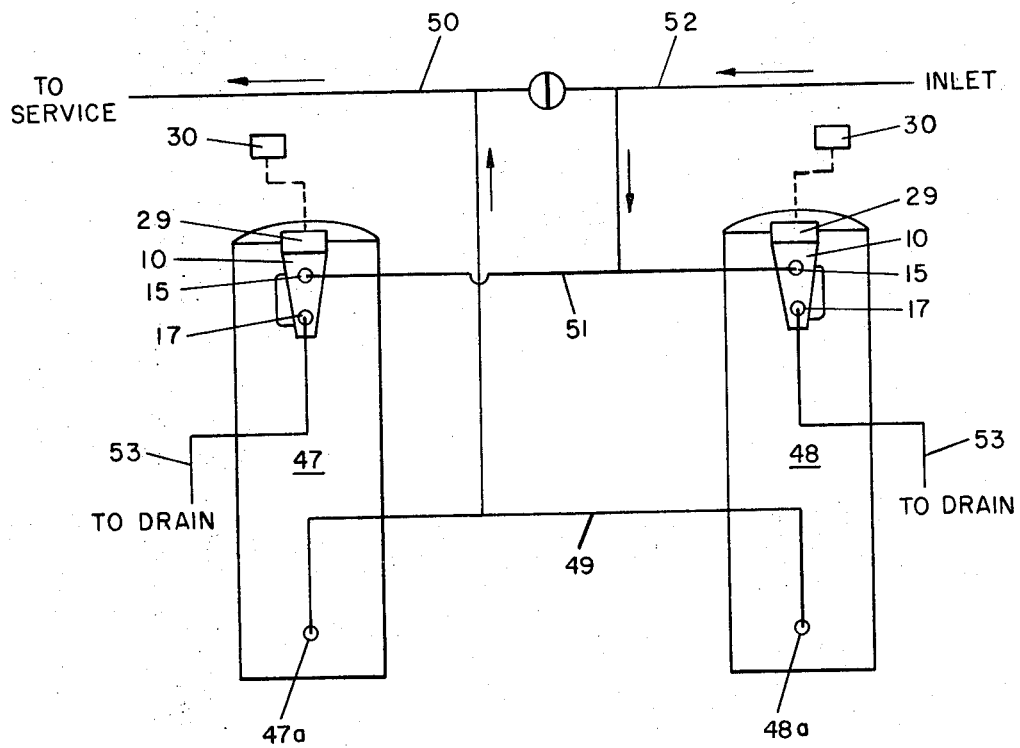
FIG. 3 is a schematic diagram of our new multiple-tank water conditioning system with semibalanced, direct-acting valves, such as shown in FIGS. 1 and 2, on each tank.

A multiple-tank water conditioning system embodying our invention is shown in FIG. 3. The system shown for exemplification has a pair of conditioning tanks 47 and 48, each having a service port 47a and 48a, respectively. The service ports are connected to each other by a conduit 49 which communicates with a service outlet conduit 50. Each tank has one of the control valves 10 mounted thereon. The inlet ports 15 of the valves are connected to each other by a conduit 51 which in turn is connected to a raw water supply conduit 52. The tank ports 16 of the valves 10 are connected to the respective tanks while the drain ports 17 are connected to drain conduits 53. The valves are operated by motors 29 which are controlled by timers 30 for alternately placing the stem of one of the valves in "service position" while maintaining the stem of the other valve in "backwash position" whereby raw water is supplied to the first tank for conditioning while the second tank is backwashed with conditioned water from the first tank.

In operation, both of the valves on tanks 47 and 48 are in service position during the normal service cycle. When it is necessary to backwash the tanks, one of the valves remains in service position whereby conditioned water is supplied for service from that tank while the other valve is moved to backwash position whereby the second tank is backwashed with conditioned water from the first tank.

For example, suppose it is desired to backwash tank 48 with water from tank 47. The valve on tank 47 remains in its normal service position while the timer and motor associated with the valve on tank 48 moves that valve to backwash position. Raw water enters the valve on tank 47 through the inlet port and passes through the valve and out the tank port to tank 47 for conditioning. Conditioned water from this tank is available for service through service outlet conduit 50. Some of the water conditioned in tank 47 passes through conduit 49 into tank 48 through service outlet 48a. The water backwashes upwardly through tank 48 and enters the valve on tank 48 through its tank port and passes therefrom through its drain port. When the backwashing cycle for tank 48 has been completed as determined by the timer associated therewith, the valve thereon is returned to service position. The procedure is then reversed to backwash tank 47 with conditioned water from tank 48. After both tanks are backwashed, both valves are placed in service position until backwashing is again desired.

Our multiple-tank water conditioning system is equally applicable to softening systems, as well as filtering systems. When used in a water softening system, provision would, of course, be made in the usual manner for drawing brine into the softening tanks to regenerate the mineral therein.

It is understood that our invention is not confined to the particular construction and arrangement of parts herein illustrated and described, but embraces all such modified forms thereof as come within the scope of the following claims.

We claim:
1. In a water conditioning system:
   a. a pair of water conditioning tanks,
      1. each of said tanks having a service port, and
      2. said service ports being connected to each other and to a service outlet conduit;
   b. a pair of semibalanced direct-acting fluid control valves, each of said control valves having,
      1. an inlet port connected to a raw water supply inlet, a tank port connected to one of said conditioning tanks, and a drain port,
      2. an inlet chamber communicating with said inlet port, a tank chamber communicating with said tank port, a drain chamber communicating with said drain port, and a fourth chamber,
      3. a reciprocal valve stem extending into said chambers,
      4. a first valve seat between said inlet chamber and said tank chamber and a second valve seat between said tank chamber and said drain chamber,
      5. a first valve element mounted on said valve stem for opening and closing against said first valve seat and a second valve element mounted on said valve stem for opening and closing against said second valve seat,
      6. said valve stem being reciprocal between a service position wherein said first valve element is open and said second valve element is closed against said second valve seat and a backwash position wherein said first valve element is closed against said first valve seat and said second valve element is open,
      7. pressure responsive means mounted on the valve stem and positioned within said fourth chamber and sealing said fourth chamber from said drain chamber in both said service and backwash positions, and
      8. a conduit continuously connecting said inlet chamber with said fourth chamber for imparting pressure in said inlet chamber to said pressure responsive means, said conduit opening to said fourth chamber at a location with respect to said pressure responsive means to assist in the movement of said valve stem from said service position to said backwash position; and
   c. mechanical operator means operatively connected to said stems and constructed and arranged to act in combination with said pressure responsive means for placing one of the valves of said pair of valves in backwash position while the stem of the other valve of said pair of valves is maintained in service position whereby raw water is supplied to one tank of said pair of tanks for conditioning while the other tank of said pair of tanks is backwashed with conditioned water from said one tank.

2. The water conditioning system specified in claim 1 wherein said pressure responsive means comprises a piston mounted on the valve stem and maintained in sliding sealing engagement with a wall of said fourth chamber.